United States Patent [19]

Byon

[11] Patent Number: 5,747,187
[45] Date of Patent: May 5, 1998

[54] LITHIUM BATTERY HAVING AN OVER-LOADING PREVENTING DEVICE

[75] Inventor: Sung Kwang Byon, Seoul, Rep. of Korea

[73] Assignee: Daewoo Electronics Co., Ltd., Seoul, Rep. of Korea

[21] Appl. No.: 686,103

[22] Filed: Jul. 24, 1996

[30] Foreign Application Priority Data

Jul. 28, 1995 [KR] Rep. of Korea ............... 95-22739

[51] Int. Cl.⁶ ..................... H01M 2/04; H01M 2/12
[52] U.S. Cl. ................... 429/58; 429/57; 429/61; 429/62
[58] Field of Search .................. 429/57, 58, 61, 429/64, 62

[56] References Cited

U.S. PATENT DOCUMENTS

| | | | |
|---|---|---|---|
| 4,855,195 | 8/1989 | Georgopoulos et al. | 429/62 |
| 4,966,822 | 10/1990 | Johnston | 429/62 |
| 4,975,341 | 12/1990 | Tucholski et al. | 429/62 |
| 4,992,339 | 2/1991 | Georgopoulos | 429/62 |
| 5,026,615 | 6/1991 | Tucholski | 429/61 |
| 5,092,901 | 3/1992 | Hunter et al. | 623/24 |
| 5,188,909 | 2/1993 | Pedicini | 429/7 |
| 5,380,606 | 1/1995 | Itou et al. | 429/194 |
| 5,418,082 | 5/1995 | Taki et al. | 429/61 |

FOREIGN PATENT DOCUMENTS

| | | |
|---|---|---|
| A1-045 250 | 2/1982 | European Pat. Off. . |
| 0 689 255 | 12/1995 | European Pat. Off. . |
| 5-205727 | 8/1993 | Japan ............... H01M 2/34 |

OTHER PUBLICATIONS

Patent Abstracts of Japan, vol. 9, No. 65, Pub. No. JP 59203376, Mar. (1985).

*Primary Examiner*—Prince Willis, Jr.
*Assistant Examiner*—Carol Chaney

[57] ABSTRACT

A lithium battery is provided which can promptly cut off current when it is being overheated by a short or the like, thereby preventing an explosion thereof. A shape-memory alloy spring made of a nickel-titanium alloy is included between the cover and the cap, either for making contact with both the cover and the cap, thereby electrically connecting the cover with the cap, or for separating from the cap in the case of an overheating of the battery, thereby electrically disconnecting the cover from the cap. A semi-spherical protrusion is formed at the center of the spring so as to make contact with the bottom of the cap, so that if the battery is overheated, the protrusion becomes flat, and is separated from the cap, thereby electrically disconnecting the cap from the cover. The semi-spherical protrusion of the shape-memory alloy spring repeatedly contracts and expands so as to prevent the overheating of the battery.

13 Claims, 4 Drawing Sheets

LITHIUM BATTERY HAVING AN OVERLOADING PREVENTING DEVICE

BACKGROUND OF THE INVENTION

1. Field of the Invention

The present invention relates to a lithium battery, and more particularly to a lithium battery which can cut off current if the lithium battery is overheated by a short therein, or the like, thereby preventing an explosion by an overload thereof.

2. Prior Art

A lithium battery is generally used as an electric power source for a portable device such as a camcorder or the like since the battery is easy to carry with and mount on the device. The lithium battery has a lithium metal as a cathode activating material, and a manganese dioxide as an anode activating material. The lithium battery also has an electrolyte which includes an inorganic electrolyte dissolved in the nonaqueous solution containing propylene carbonate. FIG. 1 is an exploded perspective view which shows a conventional lithium battery. FIG. 2 is a cross sectional view which shows an assembled state of the battery as shown in FIG. 1. FIG. 3 is an enlarged cross sectional view of portion A shown in FIG. 2. As shown in FIGS. 1 and 2, a lithium battery 100 has a case 60. A bending portion 62 is formed at an upper portion of case 60 and case 60 below bending portion 62 is filled with an electrolyte 70. Current is generated by the reaction of electrolyte 70, and is thereby applied to a load through a positive electrode lead 51 and a negative electrode lead 52. With reference to FIG. 2, negative electrode lead 52 is bent to make contact with the inner bottom surface of case 60. A cover 30 is placed at an upper portion of case 60. Cover 30 has a through hole 31 formed at the central portion thereof. Positive electrode lead 51 is bent to make contact with cover 30. Aluminum foil 32 and a ring plate 33 comprised of plastic, are stacked in cover 30. In the case of an explosion of electrolyte 70, aluminum foil 32 is easily torn so that the gases generated by the explosion are vented.

As shown in FIGS. 2 and 3, a positive temperature coefficient (PTC) thermistor 20 is positioned on cover 30. The resistance of PTC thermistor 20 approaches infinity when the temperature rises up over a predetermined value, e.g., 80 degree Celsius. PTC thermistor has an opening 21 corresponding to through hole 31 of cover 30 at the center portion of PTC thermistor 20. When the temperature of electrolyte 70 rises up over the predetermined value, the resistance of PTC thermistor 20 approaches infinity, and the current is cut off. A cap 10, which functions as a positive electrode terminal, is positioned on PTC thermistor 20. A vent hole 11 is formed at the center portion of cap 10. PTC thermistor 20 is manufactured by mixing various metals. When the temperature of the battery rises up over 80 degree Celsius, the resistance of PTC thermistor 20 approaches infinity, thereby causing the current to be cut off.

As shown in detail in FIG. 3, a gasket 40 for sealing the interior of case 60 is provided between the inner surface of case 60 and the stacked cap 10, PTC thermistor 20, and cover 30, and surrounds stacked cap 10, PTC thermistor 20, and cover 30.

Case 60 is made of a metal material which is conductive, and makes contact with negative electrode lead 52 so as to function as a negative electrode terminal. The upper end of case 60 is bent towards the interior of case 60, so gasket 40 is fixed at a position between case 60 and stacked cap 10, PTC thermistor 20, and cover 30.

A winding assembly 50 chemically reacts with electrolyte 70 in case 60, thereby generating current. Winding assembly 50 is manufactured by applying a mixture of manganese dioxide and carbon by means of a binder to a metal net of expanded metal. Current is generated by the reaction of winding assembly 50 with electrolyte 70, and is applied to a load through positive and negative electrode leads 51 and 52.

By using lithium battery 100 as above, current is generated by the reaction of winding assembly 50 with electrolyte 70, and the current generated in this manner is applied to a potable electrical device through positive and negative electrode leads 51 and 52.

In lithium battery 100, there is a possibility of explosion of electrolyte 70 due to a high temperature or an external shock. At this time, aluminum foil 33 is torn so that the expanded gases can be exhausted outside case 60 through both through hole 31 of PTC thermistor 20 and vent hole 11 of cap 10.

The conventional lithium battery 100 provides PTC thermistor 20 on cover 30 to prevent the overheating of battery 100. When the temperature of electrolyte 70 rises due to a short which occurs therein, the heat is transferred to PTC thermistor 20. The resistance of PCT thermistor 20, as above-mentioned, approaches infinity if the temperature rises up over 80° C. Therefore, when the temperature in lithium battery 100 exceeds a predetermined value, the current which flows though PTC thermistor 20 is cut off so that the overheating of lithium battery 100 can be prevented.

The materials of PTC element 20 of lithium battery 100 are generally expensive, which increases the manufacturing cost of battery 100. Further, since the contraction and expansion rates of PTC element 20 is not uniform, the conventional battery has poor reliability. Also, the response speed thereof with respect to the heat is slow.

Another battery is disclosed in U.S. Pat. No. 2,626,875, which uses carbon and organic electrolyte by means of a binder as cathode material. The battery can endure high temperature. However, in spite of the advantages of the battery, it cannot prevent a rise in the temperature of the battery.

SUMMARY OF THE INVENTION

Therefore, it is an object of the present invention to provide a lithium battery which can promptly cut off current when the lithium is overheated by a short or the like, thereby preventing an explosion thereof.

The lithium battery includes a case for containing an electrolyte therein. A winding assembly for reacting with the electrolyte so as to generate current, is provided in the case. A cover is provided which electrically contacts with the winding assembly so as to allow the current to flow. A cap, which has an electrode contacting portion for applying the current to a load, is positioned on the cover. A switching means is provided between the cover and the cap, either for physically making contact with both the cover and the cap, thereby electrically connecting the cover with the cap, or for being separated from the cap in case of an overheating above a predetermined temperature, thereby electrically disconnecting the cover from the cap.

A gasket is provided for fixing the cover, the cap, and the switching means at an upper portion of the case, and for sealing a clearance (or gap) between the stacked cover, the cap, and the switching means, and an inner surface of the case. An inward protrusion which protrudes towards the interior of the case is formed at an upper portion of the case, and the gasket is fixed between the inward protrusion and a bending portion formed at an upper end of the case. The gasket has a first bending portion formed at an upper end of the gasket, a protrusion, and a second bending portion formed at a lower end of the gasket, the first bending portion being bent towards the interior of the case so as to fix the cap, the protrusion protruding towards the interior of the case below the first bending portion so as to fix the cap together with the first bending portion, and the second bending portion being bent towards the interior of the case so as to mount the cover. The switching means is preferably a shape-memory alloy spring which can contract or expand within a temperature range of −50 to 100 degrees Celsius as the temperature of the battery rises and falls. The shape-memory alloy may be comprised of a nickel-titanium alloy.

The switching means has a disk shape of uniform thickness, a peripheral portion which makes contact with the cover so as to allow electric current to flow, and a semi-spherical protrusion formed at the center of the switching means so as to contact with a bottom of the cap, so that when the battery is overheated, the protrusion becomes flat and thereby is physically separated from the cap so as to electrically disconnect the cap from the cover. Two recesses, which have substantially the same diameters as a diameter of the semi-spherical protrusion of the shape-memory alloy spring, are respectively formed at upper and lower surface portions of the cover.

The cap has a cylindrical protrusion wherein a vent hole is formed at a center of the cap, the switching means has a disk shape of uniform thickness, a peripheral portion of the switching means makes contact with the cover so as to allow the current to flow, and a semi-spherical protrusion is formed at a center of the switching means so as to make contact with the bottom of the protrusion of the cap.

When the battery is overheated either by too much use of power or by a short generated therein, the heat is transferred through the cover to the semi-spherical protrusion of the shape-memory alloy spring. If the temperature of the shape-memory alloy spring rises above a predetermined value, e.g., 80 degree Celsius, the semi-spherical protrusion of the shape-memory alloy spring becomes flat, so that it is physically separated from the bottom of the cap, thereby causing the current to be cut off. If the temperature of the interior of the battery falls down below a predetermined value over time, the shape-memory alloy spring recovers its shape, so that the semi-spherical protrusion makes contact with the bottom of the cap, thereby allowing the current to flow. Therefore, the semi-spherical protrusion of the shape-memory alloy spring repeatedly contracts and expands so that the battery of the present invention cuts off the current, thereby preventing the overheating thereof. Precise switching operation of the current prevents the overheating of the lithium battery.

BRIEF DESCRIPTION OF THE DRAWINGS

The above object and other advantages of the present invention will become more apparent by describing in detail a preferred embodiment thereof with reference to the attached drawings in which.

DETAILED DESCRIPTION OF THE PREFERRED EMBODIMENT

Figure 1:
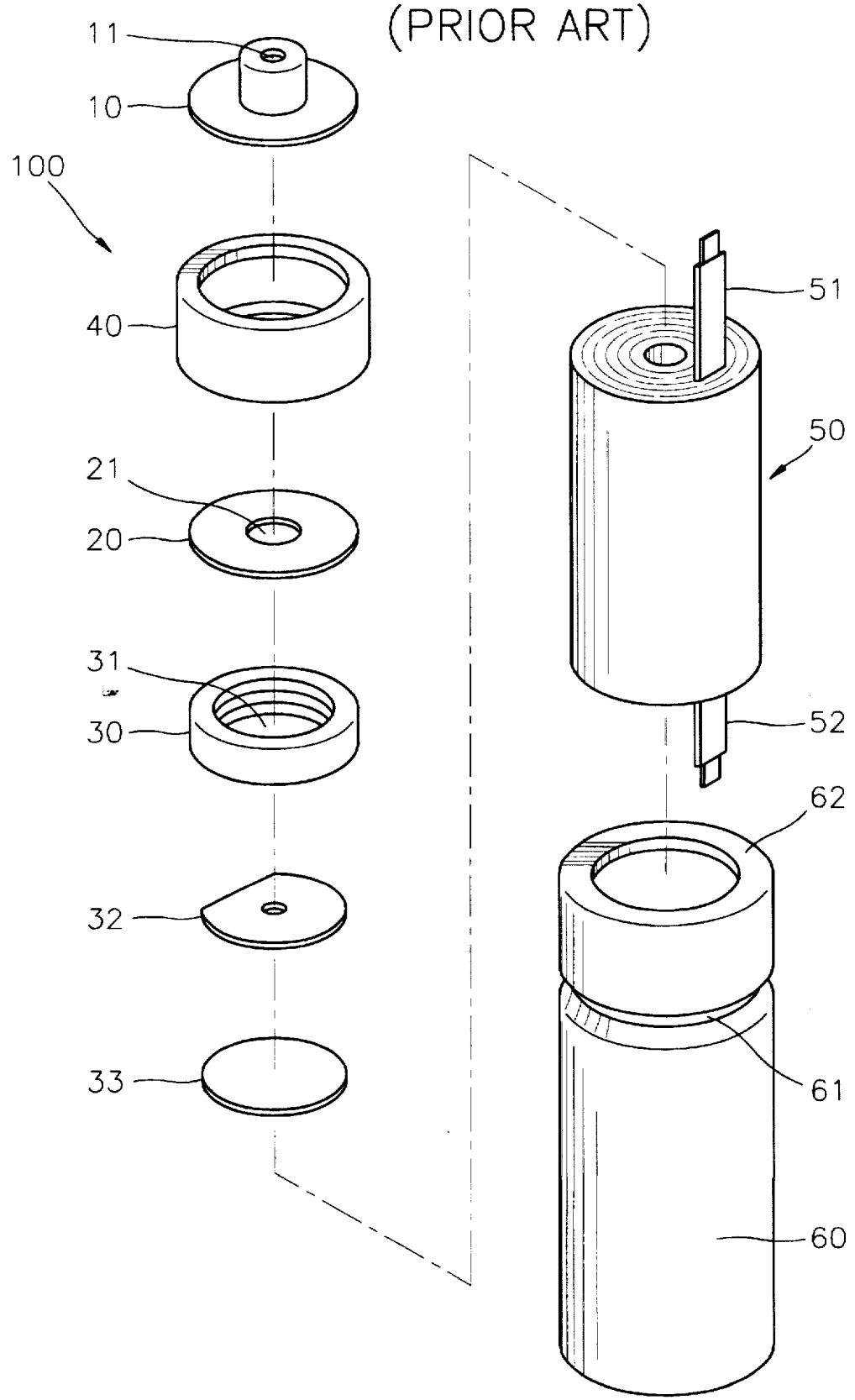
FIG. 1 is an exploded perspective view of a conventional lithium battery.
Figure 2:
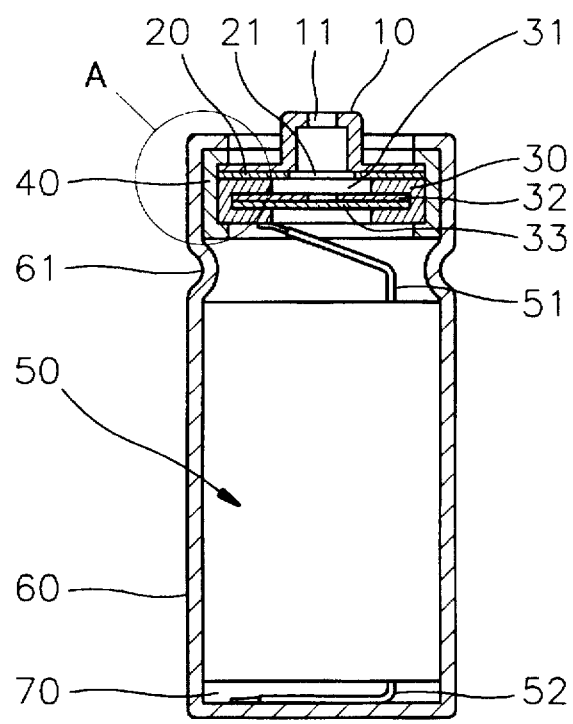
FIG. 2 is a cross sectional view for showing the assembled state of the lithium battery as shown in FIG. 1.
Figure 3:
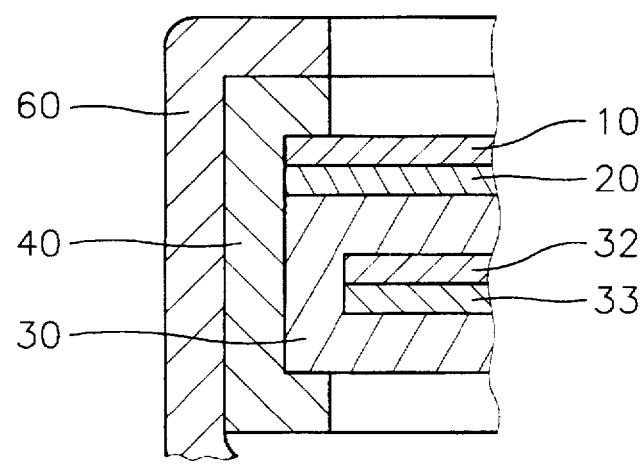
FIG. 3 is an enlarged cross sectional view of portion A as shown in FIG. 2.

Hereinafter, a preferred embodiment of the present invention will be described in detail with reference to accompanying drawings in which the same reference numerals represent the same elements.

Figure 4:
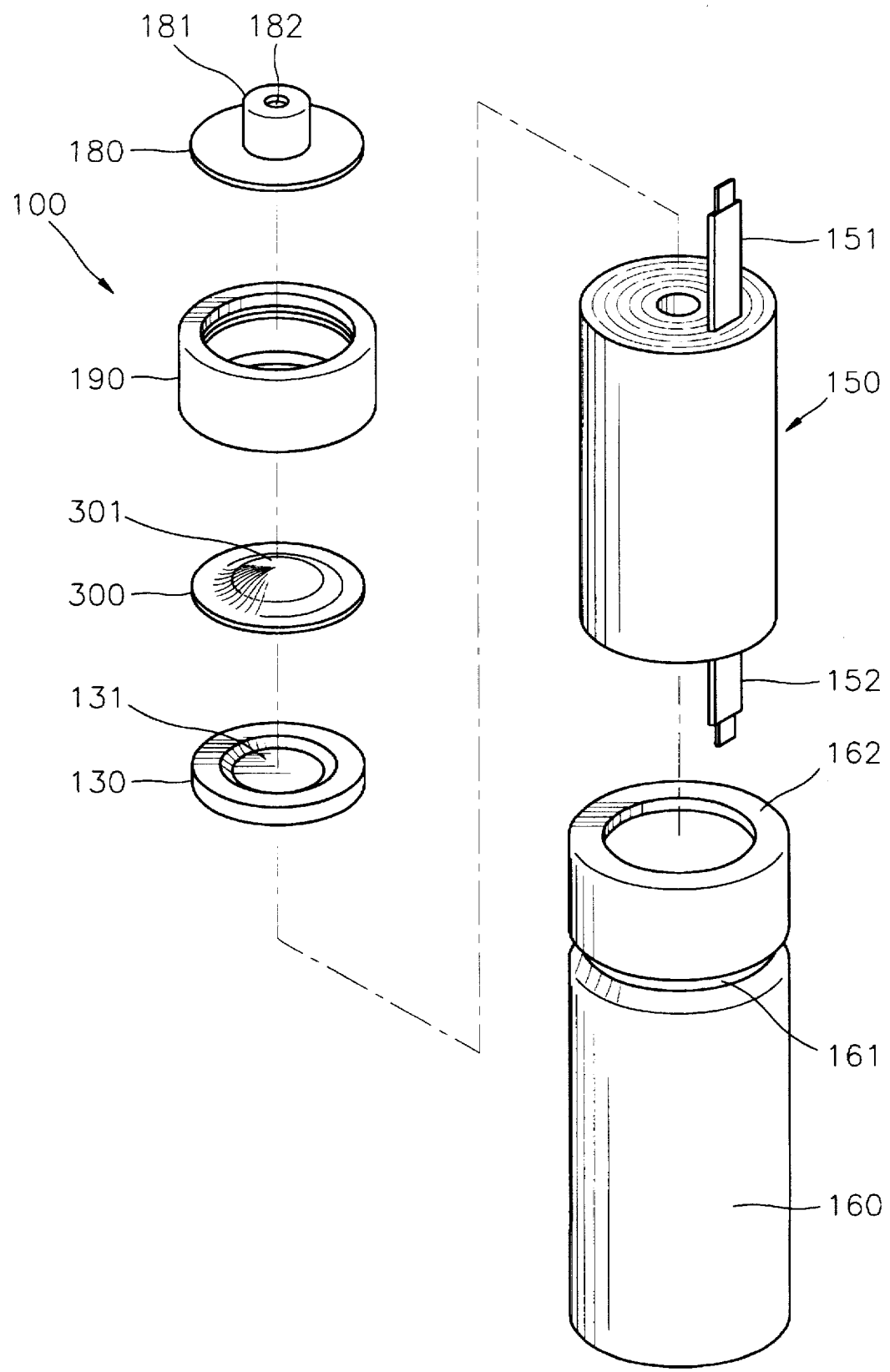
FIG. 4 is an exploded perspective view of the lithium battery according to an embodiment of the present invention.
Figure 5:
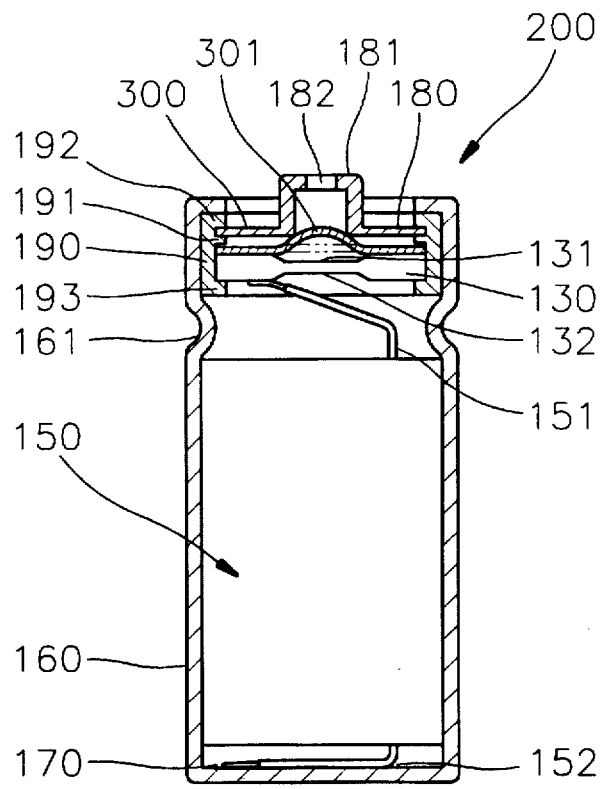
FIG. 5 is a cross sectional view for showing the assembled state of the battery shown in FIG. 4.
Figure 6:
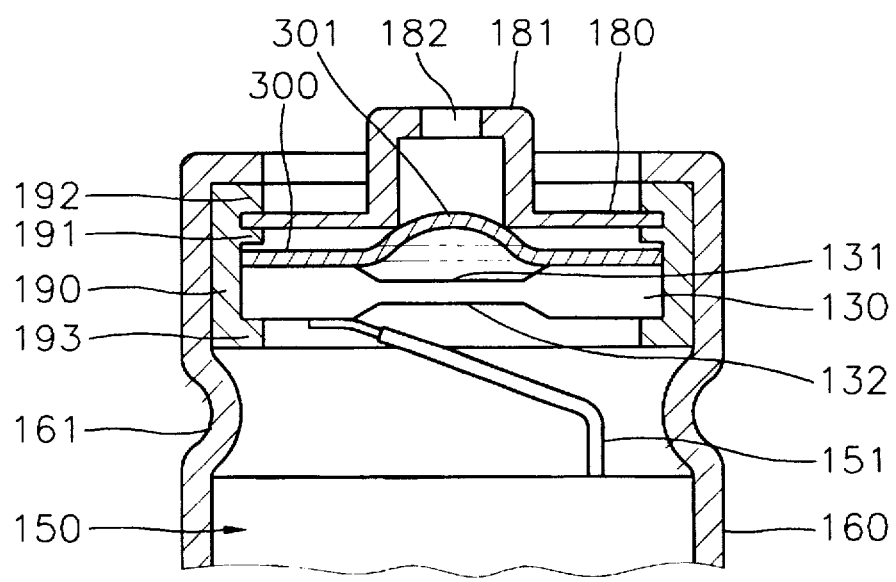
FIG. 6 is an enlarged cross sectional view of the upper portion of the lithium battery as shown in FIG. 5.

FIG. 4 is an exploded perspective view of the lithium battery according to an embodiment of the present invention. FIG. 5 is a cross sectional view for showing the assembled state of the battery shown in FIG. 4. FIG. 6 is an enlarged cross sectional view of the upper portion of the lithium battery as shown in FIG. 5.

As shown in FIG. 4, a lithium battery 200 according to an embodiment of the present invention includes a case 160. Case 160 has a cylindrical shape, and contains electrolyte 170 therein. A bending portion 162 is formed at the upper end of case 160, which is bent towards the interior of case 160. An inward protrusion 161 is formed at the upper portion of case 160, which is bent so that it protrudes towards the interior of case 160. Case 160 is comprised of a material of high conductivity. The bottom surface of case 160 functions as a negative electrode contacting portion.

A winding assembly 150 is provided in case 170, and is immersed in electrolyte 170. Winding assembly 150 is comprised of a material which reacts chemically with electrolyte 170 so as to generate current. That is, winding assembly 150 is manufactured by applying the mixture of manganese dioxide and carbon by means of a binder to a metal net of an expanded metal. Winding assembly 150 reacts with electrolyte 170 to thereby generate current.

Negative and positive electrode leads 152 and 151 are attached to the lower and upper portions of winding assembly 150, respectively. Negative electrode lead 152, which is attached to the lower portion of winding assembly 150, makes contact with the inner bottom surface of case 160, which functions as a negative electrode terminal. The current generated by the reaction of winding assembly 150 with electrolyte 170 flows through positive and negative electrode leads 151 and 152 to outside the lithium battery.

A cover 130, a shape-memory alloy spring 300, and a cap 180 are stacked in series at the upper portion of cover 130 between bending portion 162 and inward protrusion 161. A gasket 190 is provided between the upper inner surface of case 160 and the stacked cover 130, shape-memory alloy spring 300, and cap 180, at a position between bending portion 162 and inward protrusion 161 so as to fix cover 130, shape-memory alloy spring 300, and cap 180. Gasket 190 also seals the clearance between the upper inner surface of case 160 and stacked cover 130, shape-memory alloy spring 300, and cap 180. Upper and lower bending portions 192 and 193 are respectively formed at the upper and lower ends of gasket 190, which are bent towards the interior of case 160. An inward protrusion 191 is formed at the position below the upper bending portion 192. Cap 180 is fixed between upper bending portion 192 and inward protrusion 191. Cover 130 is mounted on lower bending portion 193 (that is, lower bending portion supports cover 130).

Cap 180 is comprised of a metal. A cylindrical protrusion 181 is formed at the center of cap 180, which functions as a positive electrode terminal. A vent hole 182 is formed at the center of cylindrical protrusion 181. The gas generated either by the reaction of electrolyte 170 and winding assembly 150 or by an explosion is exhausted to outside case 160 through vent hole 182.

Shape-memory alloy spring 300 is provided below cap 180, which makes contact with the bottom portion of cylindrical protrusion 181. Shape-memory alloy spring 300 has a disk shape of uniform thickness. The peripheral portion of shape-memory alloy spring 300 makes contact with cover 130 so as to allow the electric current to flow. Semi-spherical protrusion 301 is formed at the center of shape-memory alloy spring 300. The upper portion of semi-spherical protrusion 301 of shape-memory alloy spring 300 makes contact with the bottom of cylindrical protrusion 181 of cap 180. As shown in FIG. 5, shape-memory alloy spring 300 between cover 130 and cap 180 makes contact with both cover 130 and cap 180, thereby electrically connecting cover 130 with cap 180. When the temperature of lithium battery 200 rises above a predetermined value because of overheating, semi-spherical protrusion 301 of shape-memory alloy spring 300 becomes flatter, as shown by the dotted line in FIG. 6, so that shape-memory alloy spring 300 is separated (physically apart) from the bottom of cylindrical protrusion 181. As a result, cover 130 and cap 180 are electrically disconnected from each other. Shape-memory alloy spring 300 is comprised of a nickel-titanium alloy so as to contract or expand within the temperature range of −50 to 100 degrees Celsius. U.S. Pat. No. 5,092,901 (issued to Hunter et al.) discloses an example of such a memory-shape alloy. Also, EP-A1-0 045 250 discloses a method of manufacturing a motor by using a nickel-titanium alloy. Shape-memory alloy spring 300 according to the present invention can be manufactured easily by the methods disclosed in the above-mentioned publications. The contraction/expansion operation temperature can be preliminary memorized during the manufacturing process of the shape-memory alloy spring. Semi-spherical protrusion 301 of shape-memory alloy spring 300 maintains the contact with the bottom of cap 180 during a normal condition when the temperature is not varied, and is separated from cap 180 when the temperature is above a predetermined temperature, e.g., 80 degree Celsius by the contraction of semi-spherical protrusion 301, thereby cutting of the current. Therefore, in this manner, the overloading of the battery can be prevented.

Cover 130 prevents the leakage of electrolyte 170, and is electrically connected to winding assembly 150 through positive electrode lead 151. The current generated is applied to a load through positive electrode lead 151, cover 130, shape-memory alloy spring 300, and cap 180. Recesses 131 and 132, which have substantially the same diameters as that of semi-spherical protrusion 301 of shape-memory alloy spring 300, are respectively formed at the upper and lower surface portions of cover 130. The centers of recesses 131 and 132 correspond to the center of semi-spherical protrusion 301 of shape-memory alloy spring 300. Recesses 131 and 132 contribute to the reactivity of semi-spherical protrusion 301 of shape-memory alloy spring 300.

Hereinafter, the operation of the lithium battery according to the present embodiment having the above structure is explained.

When battery 200 is overheated by either too much use of power or by a short generated therein, the heat is transferred to semi-spherical protrusion 301 of shape-memory alloy spring 300 through cover 130. When the temperature of shape-memory alloy spring 300 rises above a predetermined value, e.g., 80 degree Celsius, semi-spherical protrusion 301 of shape-memory alloy spring 300 becomes flat so that it is separated from the bottom of cap 180, thereby cutting of the current. Therefore, the overheating of the battery can be prevented.

When the temperature of battery 200 falls below a predetermined value, shape-memory alloy spring 300 recovers its shape. Then, semi-spherical protrusion 301 of shape-memory alloy spring 300 becomes in contact with the bottom of cap 180 again, thereby allowing the current to flow.

Briefly, as the temperature of lithium battery 200 rises up or falls down, semi-spherical protrusion 301 of shape-memory alloy spring 300 repeatedly contracts and expands, causing semi-spherical protrusion 301 either to make contact with or to be separated from cap 180 repeatedly, thereby preventing the overheating of battery 200.

The conventional PTC thermistor cuts off the current if its resistance approaches the infinity as its temperature rises, but has the disadvantages of slow reactivity and poor accuracy. The lithium battery of the present invention adopts a shape-memory alloy spring, and due to the fast reactivity and excellent accuracy of the shape-memory alloy, it can successfully prevent the overheating of the lithium battery. Thus, the overheating of the lithium battery can be effectively prevented. Further, shape-memory alloy is generally cheaper than PTC thermistor, so the manufacturing cost of the battery can be lowered.

While the present invention has been particularly shown and described with reference to particular embodiment thereof, it will be understood by those skilled in the art that various changes in form and detail may be effected therein without departing from the spirit and scope of the invention as defined by the appended claims.

What is claimed is:

1. A battery comprising:
   a case for containing electrolyte therein;
   a winding assembly including anode and cathode electrodes so as to generate current;
   a cover contacting said winding assembly so as to allow the current to flow;
   a cap positioned on said cover and having an electrode portion for applying the current to a load; and
   a switching means contactable with both said cover and said cap between said cover and said cap for electrically connecting said cover to said cap, wherein when the battery heats to above 80 degrees Celsius, said switching means becomes physically separated from said cap so as to electrically disconnect said cover from said cap,
   wherein said switching means has a disk shape of a uniform thickness, a peripheral portion that contacts said cover to allow electric current to flow, and a semi-spherical protrusion formed at a center thereof to contact a bottom portion of said cap such that when the battery becomes heated to above 80 degrees Celsius, said protrusion flattens such that said switching means becomes physically separated from said cap and electrically disconnect said cap from said cover.

2. A battery according to claim 1, further comprising a gasket for fixing said cover, said cap, and said switching means at a first portion of said case, and for sealing a clearance between said cover, said cap, and said switching means, and an inner surface of said case.

3. A battery according to claim 2, wherein said first portion of said case has an inward protrusion that protrudes toward an interior of said case, and said case has a bending portion formed at a first end thereof, wherein said gasket is fixed between said inward protrusion and said case bending portion.

4. A battery according to claim 2, wherein said gasket has a first bending portion formed at a first end of said gasket, a protrusion, and a second bending portion formed at a second end of said gasket, which second end is opposite to the first end of said gasket, said first gasket bending portion being bent toward the interior of said case so as to fix said cap, said gasket protrusion protruding toward the interior of said case below said first gasket bending portion so as to fix said cap together with said first gasket bending portion, and said second gasket bending portion being bent toward the interior of said case so as to mount said cover.

5. A battery according to claim 1, wherein said switching means is a shape-memory alloy spring comprised of a shape-memory alloy whose dimensions vary with temperature over a temperature range of −50 to 100 degrees Celsius.

6. A battery according to claim 5, wherein said shape-memory alloy is a nickel-titanium alloy.

7. A battery according to claim 1, wherein said cover has two recesses having substantially the same diameters as the diameter of said semi-spherical protrusion formed at two opposite surface portions thereof respectively.

8. A battery according to claim 1, wherein said cap has a cylindrical protrusion with a vent hole formed at a center of said cap.

9. A battery comprising:
   a case for containing electrolyte therein;
   a winding assembly including anode and cathode electrodes so as to generate current;
   a cover contacting said winding assembly so as to allow the current to flow;
   a cap positioned on said cover and having an electrode portion for applying the current to a load;
   a shape-memory alloy spring contactable with both said cover and said cap between said cover and said cap to electrically connect said cover to said cap, wherein when the battery heats to above 80 degrees Celsius, said shape-memory alloy spring becomes physically separated from said cap so as to electrically disconnect said cover from said cap,
   wherein said shape-memory alloy spring has a disk shape of a uniform thickness, a peripheral portion that contacts said cover to allow electric current to flow, and a semi-spherical protrusion formed at a center thereof to contact a bottom portion of said cap such that when the battery becomes heated to above 80 degrees Celsius, said protrusion flattens such that said shape-memory alloy spring becomes physically separated from said cap and electrically disconnect said cap from said cover; and
   a gasket for fixing said cover, said cap, and said shape-memory alloy spring at a first portion of said case, and for sealing a clearance between said cover, said cap, and said shape-memory alloy string, and an inner surface of said case.

10. A battery according to claim 9, wherein said first portion of said case has an inward protrusion that protrudes toward an interior of said case, and said case has a bending portion formed at a first end of said case, wherein said gasket is fixed between said inward protrusion and said case bending portion.

11. A battery according to claim 9, wherein said gasket has a first bending portion formed at a first end of said gasket, a protrusion, and a second bending portion formed at a second end of said gasket, which second end is opposite to the first end of said gasket, said first gasket bending portion being bent toward the interior of said case so as to fix said cap, said gasket protrusion protruding toward the interior of said case below said first gasket bending portion so as to fix said cap together with said first gasket bending portion, and said second gasket bending portion being bent toward the interior of said case so as to mount said cover.

12. A battery according to claim 9, wherein said cover has two recesses having substantially the same diameters as the diameter of said semi-spherical protrusion of said shape-memory alloy spring formed at two opposite surface portions thereof.

13. A battery comprising:
   a case for containing electrolyte therein, said case having an inward protrusion that protrudes toward an interior of said case at a first portion thereof and a bending portion formed at a first end of said case;
   a winding assembly including anode and cathode electrodes so as to generate current;
   a cover contacting said winding assembly so as to allow the current to flow and having two recesses formed at two opposite surface portions thereof;
   a cap positioned on said cover and having an electrode portion for applying the current to a load;
   a shape-memory alloy spring contactable with both said cover and said cap between said cover and said cap to electrically connect said cover to said cap, wherein when the battery heats to above 80 degrees Celsius, said shape-memory alloy spring becomes physically separated from said cap to electrically disconnect said cover from said cap,
   wherein said shape-memory alloy spring has a disk shape of a uniform thickness, a peripheral portion that contacts said cover so as to allow electric current to flow, and a semi-spherical protrusion formed at a center thereof so as to contact a bottom portion of said cap such that when the battery becomes heated to above 80 degrees Celsius, said protrusion becomes flat to physically become separated from said cap and electrically disconnect said cap from said cover, and
   wherein said recesses of said cover has substantially the same diameters as the diameter of said semi-spherical protrusion of said shape-memory alloy spring; and
   a gasket for fixing said cover, said cap, and said shape-memory alloy spring at said first portion of said case, and for sealing a clearance between said cover, said cap, and said shape-memory alloy spring, and an inner surface of said case, said gasket being fixed between said inward protrusion and said bending portion,
   wherein said gasket has a first bending portion formed at a first end thereof, a protrusion, and a second bending portion formed at a second end of said gasket, said first casket bending portion being bent toward the interior of said case so as to fix said cap, said casket protrusion protruding toward the interior of said case below said first gasket bending portion so as to fix said cap together with said first gasket bending portion, and said second gasket bending portion being bent toward the interior of said case so as to support said cover.

* * * * *